United States Patent [19]

Hahn et al.

[11] Patent Number: 5,307,452
[45] Date of Patent: Apr. 26, 1994

[54] METHOD AND APPARATUS FOR CREATING, MANIPULATING AND DISPLAYING IMAGES

[75] Inventors: Tom Hahn; Ken Fishkin, both of Berkeley, Calif.

[73] Assignee: Pixar, Richmond, Calif.

[21] Appl. No.: 586,341

[22] Filed: Sep. 21, 1990

[51] Int. Cl.⁵ .............................................. G06F 15/62
[52] U.S. Cl. ................................... 395/132; 395/135; 395/131
[58] Field of Search .............. 395/128, 129, 131, 133, 395/135, 155, 161, 132; 340/703, 723

[56] References Cited

U.S. PATENT DOCUMENTS

| 4,524,421 | 1/1985 | Searby et al. | 395/131 |
| 4,633,416 | 12/1986 | Walker | 395/131 |
| 4,688,181 | 8/1987 | Cottrell et al. | 395/128 X |
| 4,718,024 | 1/1988 | Guttag et al. | 395/135 X |
| 4,736,310 | 4/1988 | Colthorpe et al. | 395/131 X |

OTHER PUBLICATIONS

"Painting Tutorial Notes," Alvy Ray Smith, Siggraph, Aug. 6-10, 1979.
"Merging and Transformation of Raster Images for Cartoon Animation," Bruce A. Wallace, Computer Graphics, vol. 15, No. 3, Aug. 1981, pp. 253-262.
"A Frame-Buffer System with Enhanced Functionality," F. C. Crow, M. W. Howard, Computer Graphics, vol. 15, No. 3, Aug. 1981.
"Paint," Alvy Ray Smith, Computer Graphics Lab, New York Institute of Technology, Technical Memo No. 7, Jul. 20, 1978.

Primary Examiner—Heather R. Herndon
Attorney, Agent, or Firm—Hecker & Harriman

[57] ABSTRACT

A method and apparatus for creating, manipulating and displaying images. This invention permits a user to manipulate a high resolution source image through interaction with a lower resolution display image. User operations are interpreted by a paint system processor and executed on the source image in real time (i.e., concurrently with the manipulation of the display image by the user). A "combiner" feature allows operations to be described as mathematical expressions, where operands are images and operators are chosen from a list of special related operators. This reduces the amount of memory normally required in prior art systems. An undo operation is implemented with reduced memory. The source image is stored in location A and the current user operation is executed in location B. The combiner feature joins images A and B to display the result of the operation to the user on the display. To undo the operation, the combination of images A and B is undone and only the original source image is displayed. When the current user operation is accepted, the combination of A and B is stored in location A.

19 Claims, 5 Drawing Sheets

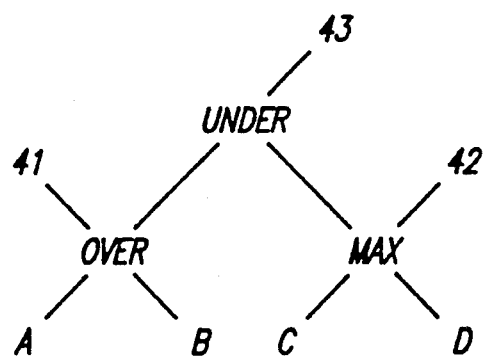
FIG. 5
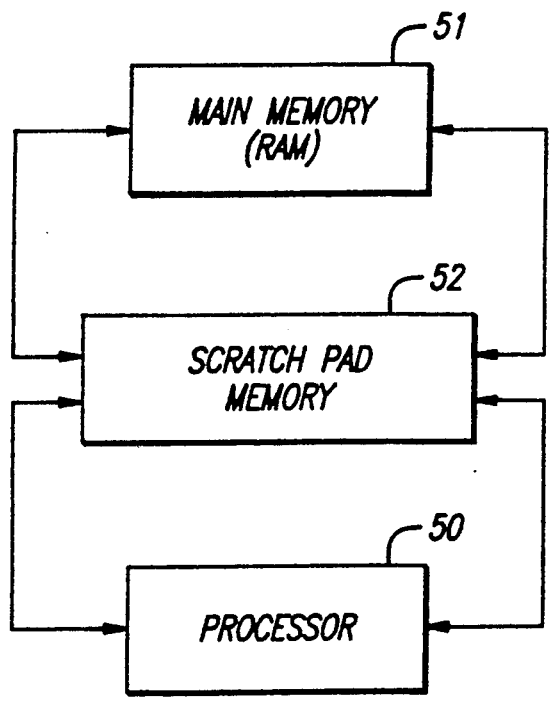
FIG. 6
FIG. 8

METHOD AND APPARATUS FOR CREATING, MANIPULATING AND DISPLAYING IMAGES

BACKGROUND OF THE PRESENT INVENTION

1. Field of the Invention

This invention relates to the field of creating, manipulating and displaying graphic images and in particular to a method and apparatus for creating, manipulating and displaying images in connection with a computer system.

2. Background Art

One application of computers and computer systems is the generation and manipulation of images. These images range from plots of mathematical functions and relationships to detailed "drawings" generated and displayed on a computer display. In other instances, images are digitized and stored in computer memory and the digitized images enhanced or altered using a computer system. The altered images are then displayed, reprinted or forwarded to an output device with the alterations included.

Typically, the methods and apparatus used to create, manipulate and display images are referred to as "paint" systems. This is because many computer systems use a "brush" metaphor associated with input and manipulation of graphics, images and the like. For purposes of the present invention, the term "paint system" refers to any method and/or apparatus for creating, modifying, manipulating, coloring and/or displaying information, data or images using a computer or display system.

Generally a paint system includes a computer or computer system, one or more memory units, a monitor, an input device and a user interface. The computer system may be a general purpose computer or a special purpose computer system such as the Pixar Image Computer ™ manufactured by the assignee of the present invention.

The memory unit is analogous to a "canvas" in that it stores the image to be manipulated or that has been created by the user. The stored image is viewed by the user on a monitor, which may be a CRT device. In the present invention, we will refer to a "color" paint system in which a variety of colors can be displayed on the monitor and specified in the memory. However, it will be apparent that the present invention will have equal application to a mono-chromatic or gray scale paint system.

The user inputs information, selects and executes operations and manipulates screen images with an electronic stylus, "mouse," or other input device which performs the function of the brush of the paint system. A cursor having a user-selectable brush image is displayed on the display device. This input device is selectably movable by the user. When moved in its input mode, the cursor on the display moves correspondingly. Typically, if the stylus is pressed against a surface, the cursor is "active". When the stylus is not pressed against a surface, the cursor is "inactive". An active cursor affects and changes the displayed image (and potentially the stored image) while an inactive cursor does not.

The user interface may include various colors, operations and settings a user may select when painting. The display may include a "palette" of colors. The user may define new colors by mixing displayed colors. Similarly, the user may select different brush shapes and sizes for different applications in creating or manipulating images. The brush is generally displayed as a two-dimensional cursor shape which may be circular, rectangular, or an irregular shape or "custom" shape.

The paint system user interface typically includes a rectangular work area on the display for displaying the stored image or some portion of it. The user uses the brush to manipulate the displayed area of the image. One or more borders of the display may contain icons, palettes, or selectors for implementing operations in the paint system. For example, a group of colors can be displayed along a border, with more colors being available for viewing through a scroll bar or rotation means. Icons representing different functions act as switches or buttons. When selected using the cursor, the operation represented by that icon is set to be performed in the work area.

Simple paint tools include pencils, brushes and erasers (for removing painted portions of an image). Common paint operations include; (1) "fill" to fill a bounded region or object with a color, pattern and/or texture; (2) "straight line" to generate a straight line from a first user selected origin point to a second user selected endpoint; (3) "circle" to create a circle of user-selected diameter; and (4) "rectangle" to create squares and rectangles of user selected dimensions. In addition, many paint systems include a "magnify" operation for expanding the resolution of a portion of an image for more detailed manipulation.

Some prior art paint systems are described in:

1. *Painting Tutorial Notes*, Alvy Ray Smith, Siggraph, Aug. 6-10, 1979.
2. *Merging and Transformation of Raster Images for Cartoon Animation*, Bruce A Wallace, Computer Graphics, Volume 15, Number 3, August 1981, Pages 253-262.
3. *A Frame-Buffer System with Enhanced Functionality*, F. C. Crow, M. W. Howard, Computer Graphics, Volume 15, Number 3, August 1981.
4. *Paint*, Alvy Ray Smith, Computer Graphics Lab, New York Institute of Technology, Technical Memo Number 7, Jul. 20, 1978.

SOURCE/IMAGE BACKGROUND

In some prior art paint systems, the source image and the display image are identical. That is, the source image is stored in a frame buffer and has the same resolution as the display image. This resolution is limited by the screen resolution such as, for example, $1024 \times 1024$ pixels. This limits the type of graphics and images that can be produced and displayed in these prior art paint systems. In this "source-as-display" system, high resolution images can not be produced because of undesirable aliasing. Such a system is also limited in its ability to transfer images to higher resolution media, such as print or film.

An advantage of the source-as-image prior art display or paint system is that operations are performed on the source image substantially in real time. That is, as operations are performed on the screen, changing the screen image, the source image (in memory) is also changed in the same manner, at substantially the same time.

One prior art attempt to improve the resolution of display images involves separating the source image from the display image. In such prior art systems, the source image is of high resolution and is stored in memory, such as in disk media. A facsimile of the source image of lower resolution is displayed as the display image. Any operations are performed as in the previous example; that is, painting operations are performed on the viewed image which is the display image. In this prior art scheme, all operations are encoded in a log. Subsequently, the log is interpreted and the operations performed on the source image, the high resolution image stored in memory. For example, if a line is drawn from a point (X, Y) on the screen to a point (X+N, Y+N), this operation is encoded into the log. Subsequently, corresponding locations in the source image are plotted and a line is drawn between those points in accordance with the log commands. One disadvantage of this system is the delay time in screen operation and operation on the source image.

Another disadvantage of prior art paint systems is that it has not been possible in the prior art to display a high resolution source image on a lower resolution display. Poor resolution results, in particular, when boundaries or edges of adjacent elements traverse a pixel on the display screen. In many prior art contexts, a pixel is typically assigned only a single "homogeneous" value, when in fact there may exist a boundary and discrete values on either side of the boundary for the object being displayed. Thus, a pixel along an edge of a display element is a sample extending over both sides of the edge.

Various approaches have been used to approximate surface boundaries within a display image. One well known method is "thresholding". In thresholding, pixels that cross a boundary are classified as being composed of one or the other material type on either side of the boundary. The projected visible boundary thus becomes the binary classified pixel border. The lower the pixel resolution, the greater the error that is introduced by thresholding. Further, for coarse images or images with high density and closely spaced surface boundaries, resultant images are increasingly less accurate and degraded. Post-processing approximation techniques are sometimes used in an attempt to render a more accurate approximation from the thresholding result. However, attempts to approximate the unknown surface gives rise to an inaccurate result since these approximations rely on the initial binary classifications of pixels.

Another prior art method of defining the source image and display image is described in "Painting a Cel; Digital Painting in a Virtual RGBA Frame Buffer" by Terry Higgins (Master's Thesis, Waterloo, Ontario, Canada, University of Waterloo). In the Higgins method, the high resolution source is separate from the display, but the display and source are the same size. The source image may be part of a larger image, but only a portion of the larger image is displayed at any one time. A portion of the source image with the same resolution as the display image is chosen. A disadvantage of the Higgins method is that only a portion of the image can be manipulated at any one time. If a user desires to work on an adjacent or nonadjacent part of the source drawing, that part of the drawing must be loaded as the active source image, which consumes time and interrupts continuity of operations.

It is desired to provide a paint system in which a high resolution source image can be displayed in its entirety on a display image of a different resolution. It is also desirable to have a paint system in which operations can be performed on a high resolution source image and displayed in real time on a lower resolution display image.

It is also an object of the present invention to provide a paint system in 7hich aliasing effects on a display image are reduced or eliminated.

UNDO OPERATION

An undo operation is a paint system tool which restores the image to its state prior to the most recently completed operation. In prior art paint systems, particularly high resolution and high performance paint systems, implementing an "undo" operation incurs an undesirably large usage of memory. In simple paint systems, an undo is achieved by storing two copies of the source image. Paint operations are performed on only one of the images. If the user wishes to perform an undo operation following a paint system operation, the unaltered image is simply copied onto the altered image. When a subsequent paint system operation is performed, the results of the most recent operation are copied onto the second image such that undo can only be performed for the most recent operation.

In a high performance paint system, where the memory requirements for a high resolution source image are presently very large, two copies of the image cannot practically be maintained because of the large memory penalty that results in paint systems using a high resolution source image. Thus, many high performance paint systems do not support an undo operation at all. It is desired to provide an undo operation on a high performance paint system having a high resolution source image without the requirement of dedicated memory.

EXECUTION OF OPERATIONS

In prior art paint systems, processing is often performed with arithmetic expressions representing operations to be formed on images. In these expressions, the operands are images, and the operators are chosen from a list of special paint system-related operators or functions. Often, operations to be formed on images are expressed as complex mathematical equations.

Consider for example where images A through D are to be manipulated. A user may want to operate on A and C to generate a first result, operate on B and D to generate a second result, and combine the first and second results through some other operation. In the prior art, intermediate results of the combinations of A and C and the combinations of B and D must be stored prior to doing the final operation, the operation on the two newly combined images. This adds to the memory requirements of prior art paint systems and slows down the operation of the paint system. It is desired to provide a method of executing operations that does not require the storage of intermediate results.

OTHER PRIOR ART PAINT SYSTEMS DEFICIENCIES

Prior art paint systems typically use a "flat" source image and display image. The entire image to be manipulated is a single two-dimensional "canvas". This is true even though the image itself may represent a three-dimensional object. It is desired to provide a paint system in which different regions or portions of a source image are manipulated on a plurality of "planes". It is also desired to provide a paint system with object oriented manipulation of images.

In paint systems, detailed line drawings are often generated or manipulated. It is sometimes desirable to change the color or pattern on certain lines in a region or portion of an image. In prior art paint systems, it is necessary to carefully trace the existing lines with a brush shape in order to change the color or pattern of the lines. Particularly near line boundaries, overflow into previously unpainted areas can occur. It is desirable to provide a paint system operation that allows the coloring or patterning of lines without the necessity of tracing individual lines.

In prior art paint systems, not all operations are orthogonal; that is, not all operations can be combined with all other tools or operations. For example, it is common for patterns and/or colors to be combined with line or shape drawing tools so that when a shape is made, it already includes or contains a pattern or desired color. Other tools and operations are not combinable. For example, prior art paint systems do not enable an "airbrush" operation (a complete implemented analogy to an air brush used in typical artist applications) to be combined with "copy" or "hue paint" operation.

When an airbrush and color or pattern is selected, the pattern is densest near the center of the cursor shape and less dense near the edges of the cursor shape. This allows the patterning or coloring of areas without the need for precision work near the boundaries. The airbrush can be moved near the boundary with some coverage available without painting previously unpainted areas. In a copy operation, a patterned image may be copied and moved to another region of an image for repair purposes. However, due to the nature of the copy and the pattern involved, a clear line boundary may be defined by the "pasted on" portion of the drawing. It is desired to combine the airbrush operation with the copy operation, so that the edges of the paste on region are softer providing for blending and less visible markings.

In a hue paint operation, the color only of a region is changed by moving the cursor brush over the region. The intensity and transparency of the color is preserved. For example, if a pale green apple is displayed, the color green can be replaced with red, and a pale red apple will result. However, the hue paint operation requires operator precision at the edge of the desired region. It is desired to combine the airbrush operation with the hue paint operation.

In the prior art, painting is a proportional mix operation. When a brush pixel is moved over an image pixel, the two pixels are merged to give a new image pixel. When a brush is passed over the same area many times, it combines with previously merged image pixels, so that the paint "builds up" as if there was a continuous supply of paint on the brush. This can lead to aliasing of the image. It is desired to provide a paint system in which the amount of paint on a brush can be controlled and known so that build up beyond a certain point does not occur, eliminating the aliasing effect.

SUMMARY OF THE PRESENT INVENTION

The present invention provides novel systems of source and display image relationship, undo, real time processing, paint application methods, and simplified operation structures.

The invention enables the user to access a high resolution source image which is viewed at low resolution. Because thresholding techniques are avoided in display of the source image, a highly accurate "facsimile" of the source image is displayed to the user. A combiner feature enables an undo operation to be implemented with reduced memory requirements, and permits real time processing of operations to the source image. A simplified operation structure and relationship aids in the high speed processing of paint system operations and allows the paint application methods and relationships of the operations to be enhanced.

The present invention utilizes a high resolution source image and a lower resolution display image. If desired, the display image may represent the entire source image, or a portion of the source image. Operations are performed by a user on the display image. These operations are interpreted by a paint system processor and executed on the source image in real time, i.e., concurrently with manipulation of the display image by the user. A facsimile of the altered source image is provided to the display. Although the display image is of lower resolution than the source image, special image processing and sampling techniques result in a display image with substantially reduced or eliminated aliasing, jagging, or threshold artifacts.

Prior art paint systems use a "flat" source image and display image. The entire image to be manipulated may be considered metaphorically as a single two dimensional "canvas". In the present invention, different "planes" of information can be defined. As paint is applied to one or more planes, they become opaque. The planes may be superimposed on top of each other to show the resulting scene. One plane may represent background scenery, with an animated character on each of one or more "upper" planes. Planes can be used as masks to protect certain areas of the image from paint operations or as text fields to place text onto images.

The paint system of the present invention incorporates various features for applying paint to the image. The methods include: (1) paint on top; (2) "paint under"; (3) "erase"; and (4) "coloring lines" (changes only pixels that are not transparent). Paint-on-top changes any pixels beneath the brush or tool used to apply paint. Paint-on-bottom involves applying a brush to the bottom of a plane so that any images above the brush will block what is visible and the paint will only be visible in transparent areas. Erase removes the image beneath the brush, rendering it transparent.

Coloring lines is used for example, when there is a line drawing with substantial transparent space and a user desires to color the lines. In prior paint systems, this involves using a brush of line width to apply the paint, and "tracing" the line image. This is tedious precision work, and very time consuming. In addition, since this method involves placing paint on top of existing paint, a build-up along the edges can result in aliasing. In the present invention color lines method, the size of the brush is irrelevant, only the nontransparent pixels are changed by the brush stroke. This allows the lines to be colored without the need to match the line size to the brush size and without the need for careful tracing of the line image.

The present invention also includes a "combiner" feature which allows a programmer to write arithmetic expressions where the operands are images and the operators are chosen from a list of special paint related operators. This feature reduces the amount of memory normally needed in a paint system. The combiner feature allows these expressions to be executed without the need to store the intermediate results, thereby permitting more complex combinations and operations to be built into the system using reduced memory.

The present invention provides "undo" with a "delayed execution". The source image is kept in location A for example. The current operation is executed in location B. The combiner feature joins A and B to display the result to the user on the display. To undo the operation, the combination is undone, with the source image preserved. When the next operation is selected, the combination of A and B is stored in A. Further, although the source image may be a color image with RGBA components, the brush strokes or other paint operations are performed in alpha only, with color provided in the combining process. As a result, the B memory location need only be one fourth the size of the source image memory.

In the prior art, painting involves a merge operation. When a brush pixel is applied to an image pixel, the two are merged to give a new image pixel. When a brush is passed over the same area many times, brush pixels are combined with previously merged image pixels, so the paint image data "builds up" as if there were a continuous supply of paint on the brush. This can result in aliasing of the image. The present invention merge operation can be thought of as using "wet" paint. Paint build-up does not occur because the present invention limits the maximum amount of paint that may be applied. The aliasing effect is eliminated. In particular, this allows a close simulation of transparent "wash" painting, where the paint does not build up in a given area even with multiple applications, beyond the degree to which the paint is inherently transparent.

The present invention paint system provides orthogonal paint operations in which any paint tools can be combined, such as an airbrush feature with the cloning and hue paint tools. In cloning, a copy of one part of an image is taken from one area of the image and transferred to another part. If retouching is needed in a spot of a textured image, a similarly sized spot is copied from another region and placed at the repair location. However, unless the texture lines and orientation are perfectly matched, an obvious edge will be seen. By having an airbrush feature with clone paint, the image is opaque in the center and more transparent at the edges. so blending can be achieved, eliminating the obvious edge of prior art cloning. Hue paint is a method of painting which preserves lightness and darkness and only changes the hue. Hue painting near edges can be difficult, requiring careful brushing. With the airbrush feature, it is easier to work near edges and combine effects.

BRIEF DESCRIPTION OF THE DRAWINGS

FIG. 5 illustrates a logic tree generated by the combiner of this invention.

FIG. 6 is a block diagram of a memory configuration for use with the present invention.

FIG. 8 illustrates a two scan line by four pixel array.

DETAILED DESCRIPTION OF THE PRESENT INVENTION

Figure 1:
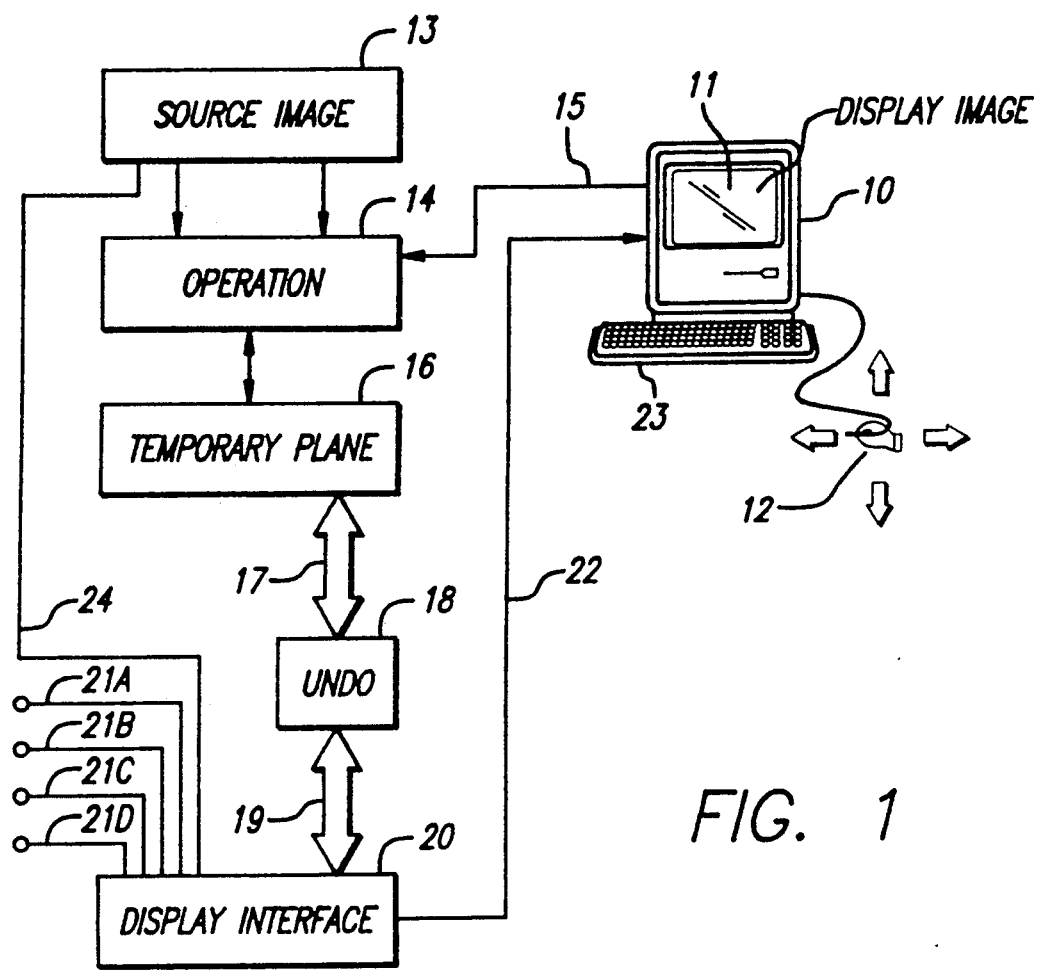
FIG. 1 is a block diagram of the paint system of the present invention.

An improved computer system is described. In the following description, numerous specific details, such as image resolution, number of planes, etc., are set forth in order to provide a more thorough description of the present invention. It will be apparent, however, to those skilled in the art, that the present invention may be practiced without these specific details. In other instances, well known features have not been described in detail so as not to obscure the present invention.

In the following description, several terms are used frequently. These terms are described below by way of example and reference and should not be construed to limit the spirit or scope of the present invention.

The term "source image" is an image which is stored in a memory means. The image may include graphics, text, characters, information, color, or other image information.

A "display image" is a representation of (or portion of) the source image which is viewed by the user when using a paint system. The display image may be displayed on a video display output device such as a cathode ray tube (CRT). However, any suitable display may alternatively be utilized in the present invention. In the following discussion, a display device consisting of an array of picture elements (pixels) is used to present the display image.

The term "brush" refers to a screen cursor of selected or desired shape. The cursor is controlled by an input device such as a mouse or stylus. The stylus or mouse may include a mechanism for sensing the application and release of pressure.

A brush "stroke" begins with the application of pressure to the stylus and ends with the release of pressure on the stylus. The stylus is moved by the user over a pad or other surface and the brush moves in a pattern corresponding to the movements of the stylus. During a stroke, the user sees a succession of copies of the brush.

The brush is typically a two-dimensional shape that may have a "pattern" which is replicated during a brush stroke. Paint systems often include a number of preselected brush patterns such as stripes, dots, checkerboard, etc. In addition, any number of desired or user-defined patterns may be provided.

In addition to patterns, the brush may be a solid or uniform "color" selected from a palette of predefined colors or from any number of user-defined colors. Each pattern could also include one or more colors.

The term "fill" means to change the pattern and/or color of a bounded region of an image. A fill operation is used in lieu of repeated brush strokes to color or pattern a bounded region.

The term "clone" (or copy) is used to denote the operation of selecting a region of an image and making a duplicate copy of that region. This copy may then be moved to another portion of the image and "pasted" so that two copies of the selected region now exist in the image.

In one embodiment of an "erase" operation, a cursor shape is used as an "eraser". When pressure is applied to the stylus, activating the cursor, and the cursor is moved, that portion of the image beneath the cursor reverts to an initialized state (e.g., all white or all black) or reveals layers of paint from the image associated with being "beneath" the cursor.

Many paint systems include a "magnify" operation. In a magnify operation, a selected region of the image is magnified so that detailed manipulation of that region may be achieved. The altered region then can be de-magnified back to its original state with the changes intact.

In addition, a paint system may include several automatic drawing operations such as "straight line" in which a line of user-defined width is drawn from a user-selected beginning point to a user-selected end point regardless of variation in the motion of the cursor between those points. In addition, automatic shape generation such as rectangles, ellipses and/or circles may be provided. Generally, shapes may be predefined as having a certain pattern and/or color as well.

SOURCE/DISPLAY

The paint system of the present invention permits a user to operate on a high resolution source image while displaying that image as a lower resolution display image. This system has the advantage of substantially real time response while providing improved performance capabilities. The system also supports an undo operation without requiring additional memory. A preferred embodiment of the present invention is illustrated in FIG. 1. A terminal 10 is the user interface for the paint system of the present invention. The terminal 10 includes a display 11 for viewing the display image of the paint system. An input device such as a stylus 12 is coupled to the terminal 10 and controls a cursor/brush on the display 11.

When pressure is applied to the stylus 12 (e.g., the tip pressed against an input pad) and moved about in a two-dimensional plane, the screen cursor/brush follows the path of the stylus within the limits of the screen boundaries. In some instances, the tip of the stylus is made to be pressure sensitive, so that the "firmness" of a brush stroke can be implemented in the paint system of the present invention. The stylus 12 may be used to select operations from along a menu bar or border on the display 11. In other instances, operations are selected through the keyboard 23. Methods for generating a cursor on a screen which tracks the movement of an input device such as a stylus or mouse are well known in the prior art.

The source image 13 is stored in the main memory of the computer, such as random access memory (RAM) or other semiconductor-based memory. The resolution of the source image may be any user defined level. The source image may be scanned into memory with a suitable scanning input device or photo digitizer or may be entered directly from the user interface terminal 10. That is, an original "painting" may be created by a user and stored as a source image for later manipulation or combination.

In the preferred embodiment of the present invention, images scanned at a resolution of 1024 DPI are typically utilized. It will be apparent, however, that images of greater resolution or lower resolution may be utilized without departing from the scope of the present invention. When original images are created by a user at the user interface, any desirable resolution for the image may be defined, subject to the constraints of main memory. This is true, even though the display 11 has a fixed resolution in terms of number of pixels. In the present invention, magnification features allow the resolution limit of the screen to be overcome when directly inputting images.

In the preferred embodiment of the present invention, a display 11 having a resolution of 1024×768 pixels is utilized, although any suitable screen display may be utilized having different resolutions without departing from the scope of the present invention.

The source image 13 is affected, altered or modified by an operation 14. When a user selects an operation to be performed on the display image, this operation is coupled on line 15 to the operation block 14, along with the region of the display image upon which the operation is to be performed.

Although only a single source image 13 is illustrated, a plurality of source images (e.g., 21A-21D) may be utilized by the paint system of the present invention.

The source image 13 stores color and opacity values for each pixel of an image. Color values are stored in three segments as red (R), green (G), and blue (B) components. The opacity of each element of a source image is stored as its alpha (A) component. These RGBA values are stored as part of the source image 13. Thus, the temporary plane 16 is only one fourth the size of the source image 13.

When an operation is selected by a user, the operation is executed on the value stored in the temporary plane 16. The temporary plane 16 stores the cumulative effect of all prior operations executed by the user. An operation is not considered to be executed by the user until the user selects and executes a new operation. Prior to that, the most recently performed operation can be "undone".

When a user selects an operation, it is executed on the temporary plane 16 and coupled through bus 17 to the undo switch 18. The output 19 of undo switch 18 is coupled to display interface 20. The source image is also coupled on line 24 to the display interface 20. Other images, such as images 21(a)-21(d), may also be coupled to the display interface. The display interface 20 combines all of the images and provides them on line 22 to the user interface terminal 10 where they are displayed on the display 11 as the display image. This display procedure displays the image as if the user operation has already been performed. However, because this operation has not yet been executed on the source image, the undo switch 18 may be utilized to remove the effects of the most recently selected operation. In addition, although the temporary plane stores only alpha information, the RGB information is utilized from the source image so that the display image is in color. The undo switch 18, in the preferred embodiment of the present invention, simply decouples the temporary plane 16 from the display interface 20 so that only source image information is provided. Therefore, the display image is viewed as if the most recent operation had not been executed.

Once a user selects a new operation, the most recently selected operation is executed on the source image 13.

STANDARD STATES

In the paint system of the present invention, the system is generally in one of three standard states. The three states are NULL, PENDING, or UNDONE. When the state is NULL, no operation is pending, and the system is in a reset state. When the state is PENDING, an operation has taken place but has not yet been accepted. The effect of the operation is visible on the display screen but the source image has not been changed. When the state is UNDONE, an undo operation has just taken place. The state can change from NULL to PENDING, but not directly from NULL to UNDONE. It may change from PENDING or UNDONE to NULL (when an operation is accepted). It can change from PENDING to UNDONE and from UNDONE to PENDING. It should be noted than an undo operation can also be UNDONE (undo undo). In the present invention, this is accomplished by toggling the undo switch 18. When the paint system is in the UNDONE state, and a new operation is selected, the previous PENDING operation is not accepted. However, if an undo undo is performed, and a new operation selected, the previous PENDING operation is accepted.

Figure 2:
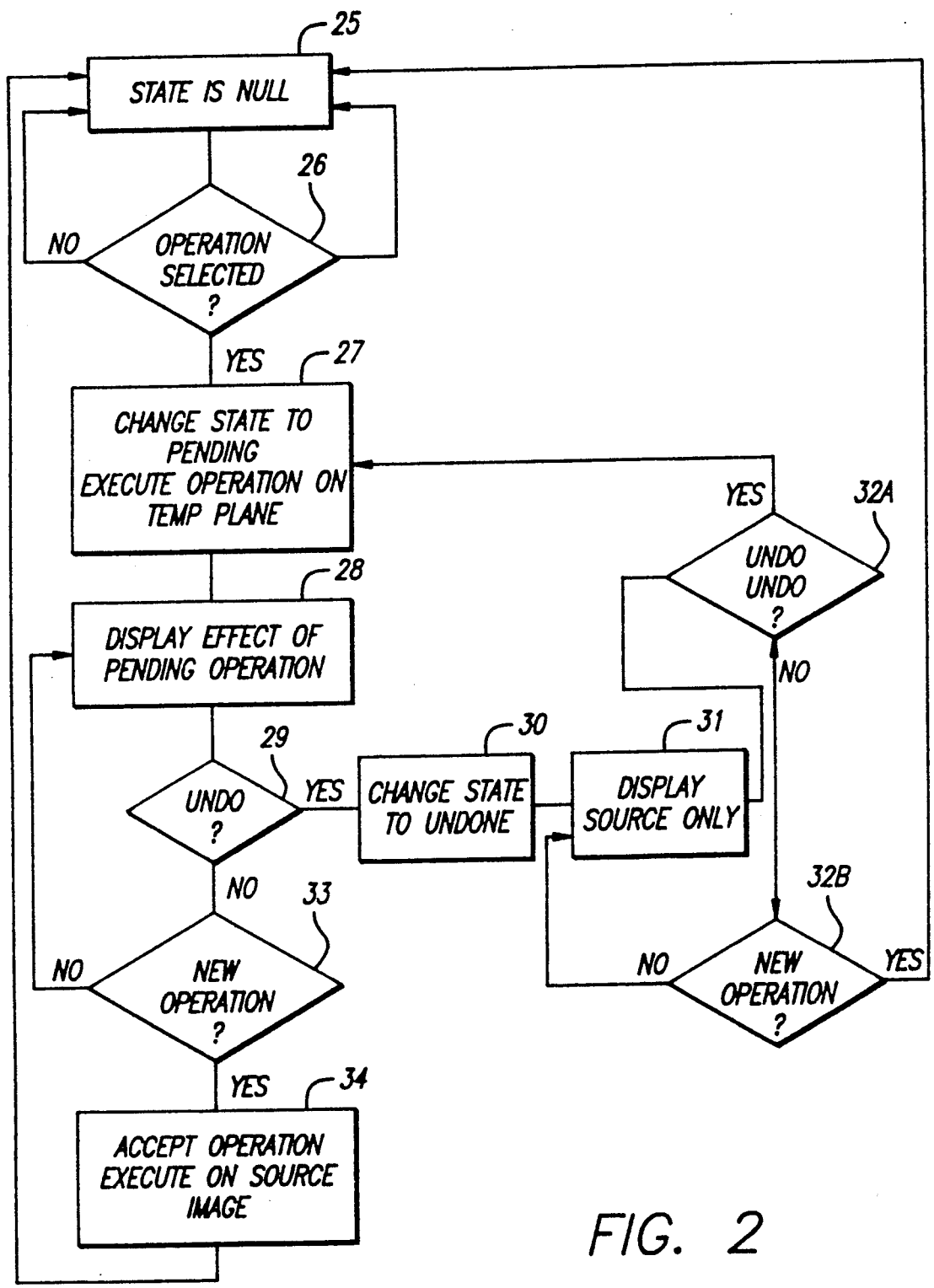
FIG. 2 is a flow chart illustrating the various states of the paint system of FIG. 1.

FIG. 2 shows the sequencing of the selection of a new operation and operation of the undo feature in the present invention. At step 25, the state of the system is NULL. At step 26, a query is made to see if an operation has been selected. If no, the state remains NULL; if yes, at block 27, the state is changed to PENDING and the PENDING operation is executed on the TEMP plane. At block 27, the display interface combines the source image and the temporary plane to show the effect of the new operation on the user display.

At decision block 29, it is determined whether an undo feature has been selected. If the undo has been selected, the state is changed to UNDONE at block 30, and the display interface provides the source image only to the user display at block 31. If undo is not selected, the system determines if a new operation has been selected at decision block 33. If no new operation is selected, the system returns to display the combination of the source image and temporary plane at block 28. If a new operation has been selected, the system accepts the pending operation and executes it on the source image at block 34 and returns to block 25 and the state is NULL.

At decision block 32A, it is determined if "undo undo" has been selected. If yes, the state is changed to pending at block 27. If no, the system proceeds to decision block 32B and it is determined if a new operation has been performed. If yes, the system returns to decision block 26. If no, the system returns to step 31.

The step of changing an operation state from the point where it is temporarily performed, to the point where it is actually performed is called "accepting" the operation. When an operation has been chosen by the user, but not yet accepted, the operation is "pending". In the preferred embodiment of the present invention, no operation requires more than one alpha plane for its pending state. This results in a factor of four reduction of memory requirements in implementing an undo operation. Typically, an operation is accepted when the user switches from one operation to the next operation.

STATE OPERATIONS

There are four standard state operations in the preferred embodiment of the present invention; ACCEPT, UNDO, UNDO UNDO, and DISPLAY. The ACCEPT state command instructs the paint system to perform an ACCEPT operation on the PENDING operation. The ACCEPT command then changes the global state of the paint system to NULL. The UNDO command, as noted previously, instructs the paint system to perform an UNDO operation and changes the global state to UNDONE.

The UNDO UNDO command instructs the paint system to perform an UNDO UNDO operation and changes the global state to PENDING. The previously deselected PENDING command is now a PENDING command again.

The DISPLAY command instructs the paint system to display the screen image, which may be a combination of the source image and the temporary plane whenever the state of the paint system is PENDING. The present invention implements the notion of "OPDO" functions. Each operation must be able to perform certain operation-specific subfunctions related to the state of the paint system. Each operation contains a single routine referred to as the operation's OPDO function. Each OPDO function consists of a four-way switch statement and each switch statement contains the code required to execute any of the four standard state functions referred to above. For example, if an INVERT operation is selected, the paint system can either ACCEPT, UNDO, UNDO UNDO, or DISPLAY the invert operation. Generally, the operation is displayed and then subsequently accepted when a new operation is selected. However, UNDO and UNDO UNDO operations are always available before the operation has been accepted.

The following is a list of operations supported in the preferred embodiment of the present invention:

TABLE I

| | |
|---|---|
| OVER1 | UNDER1 |
| AXB4 | SCALE1 |
| SCALE4 | INVSCALE1 |
| INVSCALE4 | INVERT1 |
| INVERT4 | MIN |
| HUE | MAP1 |
| MAP4 | BITMERGE |
| CONVERT1 | CONVERT4 |
| PROJECT | GROUP1 |
| GROUP4 | OUTPUT1 |
| OUTPUT4 | CONVOLVE1 |
| CONVOLVE4 | OVER4 |
| UNDER4 | INTO4 |
| DISPLAY | GRADATE4 |
| CHA4 | AXB1 |
| RGB2HSV | CLOBBER |
| MAX | LERP4 |
| LERP1 | CLAMP |
| CLAMPALPHA | RGB2YIQ1 |
| RGB2HSV1 | ELLIPSE |

It will be apparent that the present invention may be utilized with other operations in addition to or instead of the above-listed operations.

COMBINER

The combiner of the present invention permits high speed execution of paint operations, reduced memory requirements, easier implementation of high level command languages, and presentation of a display facsimile of high resolution source images.

The combiner is an interface between the host computer and a frame buffer. Generally, a host computer is not optimized for image processing. Therefore, the paint system of the present invention does not rely on the host to execute operations on data stored in the frame buffer. In the present invention, the host provides commands to the combiner interface. The combiner, in conjunction with an image computer, executes the commands on the frame buffer data.

The organization and structure of the combiner makes it possible to execute these commands at a very high rate of speed with low memory requirements. This permits "real time" processing of images and execution of commands on high resolution source images. In addition, commands from the host computer can be high level language type of commands, reducing the code required at the host level.

Many paint system operations require a plurality of individual steps to accomplish. For example, at a high level, the host may command the following operation:

Image A OVER Image B
RESULT in Image C

In order to execute this operation, the executing processor must identify the locations of A and B, the code representing the OVER operation must be accessed and executed, and temporary registers must be assigned for A and B and for the output C. Finally, the output C must be displayed to the screen.

The combiner of the present invention provides a plurality of modules representing operations at the command level. The combiner translates the high level commands into machine readable commands, accesses the appropriate function codes, defines temporary storage locations, and performs execution of the operations.

Figure 3:
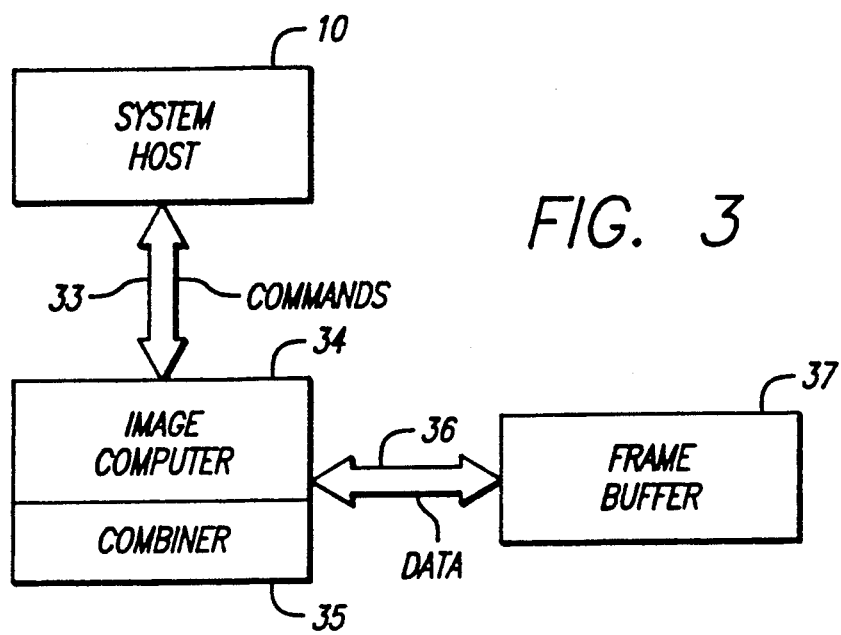
FIG. 3 is a block diagram illustrating the combiner of the present invention.

Referring to FIG. 3, the system host 10 provides commands on a command bus 33 to the image computer 34, which includes the combiner 35. The image computer accesses data on bus 36 from frame buffer 37. When a command is sent from the system host to the image computer, the combiner breaks it down into predefined modules and executes the operation. In the present invention, temporary storage requirements are minimized by executing the instructions one scan line at a time. This is possible because of the high speed performance of the high speed image computer and combiner operations.

The image computer 34 may be a parallel processor such as described in U.S. patent application Ser. No. 748,409 entitled "SELECTIVE OPERATION OF PROCESSING ELEMENTS IN A SINGLE INSTRUCTION, MULTIPLE DATA STREAM (SIMD) COMPUTER", and assigned to the assignee of the present invention.

Figure 4:
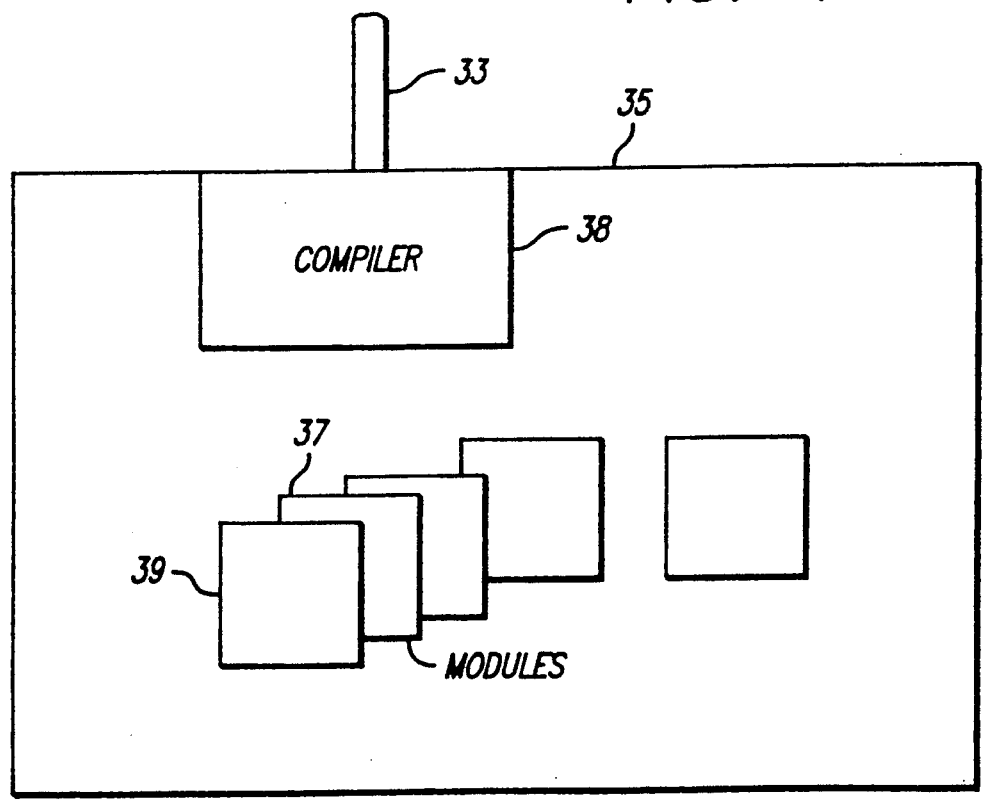
FIG. 4 is a block diagram of the combiner of FIG. 3.

The combiner is shown in detail in FIG. 4. The combiner 35 includes a compiler 38 which translates high level commands from the host to machine readable language. The combiner includes a plurality of modules 39 representing operations to be performed in the paint system of the present invention.

The combiner 35 provides streamlined execution of operations to be performed on images. In the prior art, each specific function is written separately, and all possible cases of functions have to be anticipated. For example, in the prior art, each of the following operations is written as a separate function:

paint with brush
paint with color
paint with texture
paint with pattern
paint with mask The combiner permits the use of high level language expressions in which operations are only written once but are combined with different sources, destination, image planes, and/or other operations so that variations of the functions do not require separate solutions. This is achieved through the use of an expression tree which is generated by the combiner based on the desired operation.

By generating an expression tree, the combiner "knows" what it about to happen after each part of a complex series of operations, so that temporary storage requirements are minimized, and speed of execution is maximized. For example, a user desires to execute the following series of functions:

(A Over B) Under (C MAX D)

where A, B, C and D are images. In the prior art, the expression (A Over B) is executed and the result placed into a temporary storage location, e.g., T1. C MAX D is then executed and the result stored in storage location T2. T1 is then placed under T2 and the resulting image is placed into a destination location.

The disadvantage of the prior art approach is when the source images require large amounts of memory so that temporary storage locations T1 and T2 also require large amounts of memory. Thus, the complexity or number of levels of operations is limited by the amount of available memory. Large amounts of otherwise dormant memory may be required to be dedicated to the possibility of future complex operations. Memory is expensive and it is desired to not require large amounts of unused memory.

In a paint operation, the brush shape is stored in a brush plane. To paint with a brush, the brush is applied to a table which translates entries in the brush from distance to opacity, for example. The brush is then applied to another table to add color and is then applied over a destination image. Thus, three operations are required for one function. The combiner allows all of these individual functions to be combined and executed in a lockstep. The combiner operates by executing operations on one scanline at a time of the image. In the example given, the combiner may take the first line of the brush image, the first line of the opacity table and the first line of a color table and execute all of the operations simultaneously. any temporary storage that is still required is only one scanline in size, saving on memory requirements. The execution of operations one scanline at a time is only possible because of the speed of the combiner.

In addition to the time savings, the present invention allows high level command language to be implemented in which all possible combinations and expressions do not have to be anticipated prior to implementation. The present invention allows a user to request any operations and an expression tree is generated for the operation. The combiner of the present invention provides a command language with a number of commands (e.g., 30) such as load picture, perform over, run picture through table, etc. Combinations of these commands are sent to the combiner from a host computer. The combiner reviews the proposed command, and prepares an expression tree so it can be executed on the image computer. The combiner determines where to read the picture from, where any tables are located, what subroutines to call to actually run the picture through a table, etc. The advantage is that on the host side, the sequence of commands is flexible and entries can be added and subtracted at will. This allows for descriptions of operations to be done instead of a precise implementation giving more power to a user.

PLANES

Figure 9:
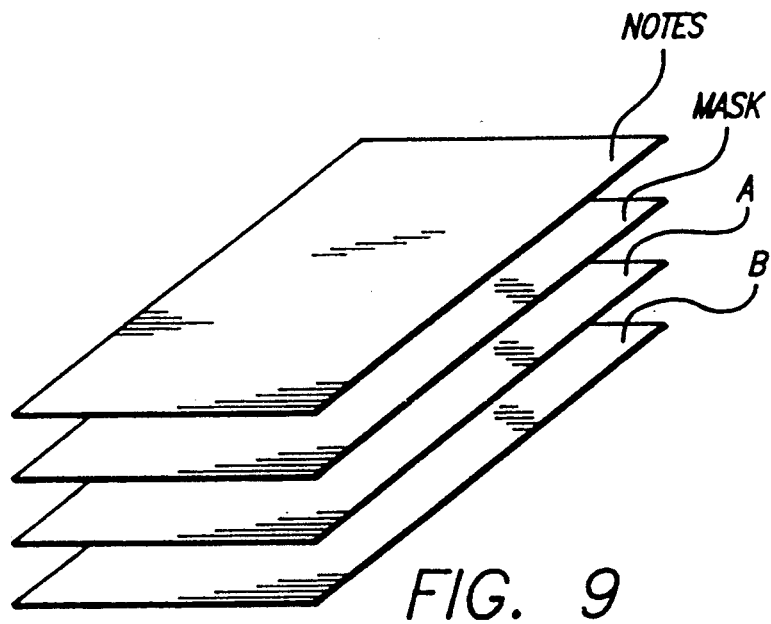
FIG. 9 illustrates the configuration of image planes in this invention.

The present invention provides a number of planes for use in generating images. The planes used in the preferred embodiment of the present invention are illustrated in FIG. 9. Four planes, a "notes" plane, a "mask" plane and A and B planes are provided. The notes and mask planes are single color planes while the A and B planes are full RGB color planes. Although the notes and mask planes are single color in this embodiment, they may be configured as full color planes, if desired. The planes may be selectively activated and deactivated. If more than one plane is active, the planes are displayed top to bottom in the order shown in FIG. 9. That is, the notes layer is considered the uppermost layer of the displayed image. Images on underlying planes may be obscured by images on overlying planes.

When painting with this invention, one plane is designated as a "current plane." Any operations executed on the display will be executed only on the current plane. A user may choose to use only a single plane for generating images or may use two or more planes to create layered images which can be selectively combined to result in a variety of display images.

The mask plane serves as a mask or stencil. This plane can be turned "on" when another plane is the current plane. Wherever paint appears in the mask plane, corresponding locations in the current plane are "protected." That means, when paint is applied to the current plane, it only appears in unprotected areas.

There are four methods of paint application in this invention, namely Over, Erase, Under and Into. The Over mode of painting is analogous to traditional painting with a paintbrush. Paint is applied on top of an image and hides or covers images below the paint. Erase mode removes paint wherever the cursor or brush passes, much like erasing a blackboard. The pixels are changed to some set state, for example, white.

Under mode involves painting underneath an image. In the Under mode, paint is applied only where no paint exists. Any pixels which currently have a color are not affected. In the Into mode, only pixels where there is existing paint are affected. There is not change in pixels which were erased or had no paint. Into may be used for changing the color of an existing object without the requirement of painting "between the lines." Only the object pixels will be affected. The painting operation can be done quickly and without requiring a great deal of precision.

TREE GENERATION

The LAN language from the host computer is similar to an assembler language. The assembler language is a description of operations to be performed by the image computer. The assembler language consists of a series of functions defined by the modules in the compiler. The combiner receives a sequence of these assembler commands, combines them into a tree and executes the entire sequence all together on each scan line of an image. For example, even though the image might be 1000×1000 pixels, the commands are executed one scanline at a time by the combiner. Returning to the example of (A over B) under (C MAX D) the combiner generates a tree as illustrated in FIG. 5. Destinations A and B are coupled to node 41 (Over). Images C and D are coupled to node 42 (MAX). Nodes 41 and 42 are combined into node 43 (Over). The nodes are modules such as modules 39 of the combiner.

The combiner also tracks locations for the operations. In other words, the user is not required to define registered locations for execution of these operations. The combiner determines where the inputs are to be received from and which registers will be used to store the images. The advantage of the tree generation is that the destination does not need to be explicitly defined, temporary registers do not have to be allocated and the format can be easily changed. All that is required is that the tree begins with a single node at the top. It is not necessary to pre-declare all of the possible different trees that a user would desire. The trees are built as requested. The combiner allows algorithms and operations to proceed in either the X or Y major order. Normally, the expression trees are compiled by the combiner in Y major order. However, an X major evaluation can be generated, if desired. This allows the system to execute two pass algorithms. The combiner also allows bottom-up evaluation of operations.

The nodes in the expression tree, whether operators or operands, are five different types, as follows:
1. A one-component constant referred to as a scalar.
2. A four-component constant (i.e., a pixel) or a voxel
3. The address of a one or four-component plane
4. An operation (e.g., Over, MAX, etc.)
5. A pointer to integers (e.g., a look-up table, a convolution matrix, etc.).

The node operations are illustrated in Table 1 above.

In operation, most functions work on a scanline in, scanline out basis. That is, given one scanline of input, one scanline of output is produced. However, an operation could conceivably produce more than one line of output per line of input (e.g., Y replication) or more than one line of input may be required to produce a single line of output (blurring, for example).

The operation of the combiner may be demonstrated in part by reference to the memory contents of the computer system during various stages of operation of the combiner. An block diagram of a typical memory configuration of a computer system is illustrated in FIG. 6. A processor 50 has an associated main memory 51, typically random access memory (RAM). A smaller "scratch pad" memory 52 (also known as "spad" memory), is coupled to the main memory 51 and the processor 52. The processor 50 loads the contents of memory addresses in the main memory 51 into the scratch pad memory 52 for manipulation.

FIGS. 7A-7G illustrate the contents of the scratch pad memory 52 during operation of the expression represented by the tree of FIG. 5. The combiner evaluates the expression in "Postfix" format so that (A Over B) under (C MAX D) becomes A, B, OVER, C, D, MAX, UNDER.

Figure 7A:
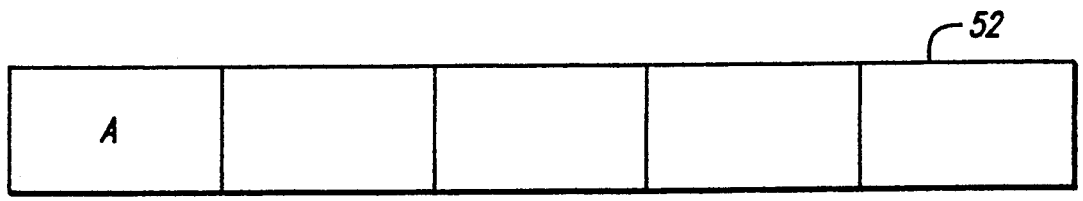
FIGS. 7A-7G illustrate the scratch pad memory of FIG. 6 during various stages of operation of this invention.
Figure 7B:
Figure 7C:

Referring to FIG. 7A, the combiner first loads the first scan line of the first operand, A, into the scratch pad memory 52. Next, the first scan line of the second operand, B, is loaded into the scratch pad memory, as shown in FIG. 7B. This is referred to as "pushing" a scan line. The operation OVER is then provided to the combiner. When the combiner receives an operation such as OVER, it expects to have two operands available on which to execute the operation. Therefore, the combiner uses the two entries in the scratch pad memory. The operation OVER is then executed on the two operands and the result is stored in the scratch pad memory as shown in FIG. 7C.

Figure 7D:
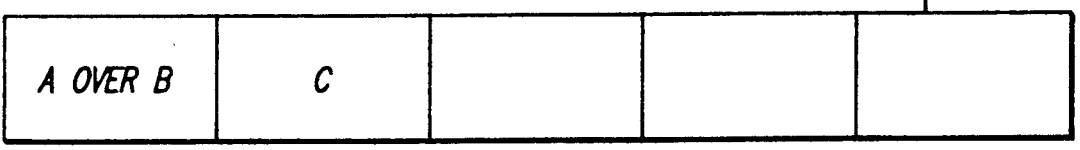
Figure 7E:
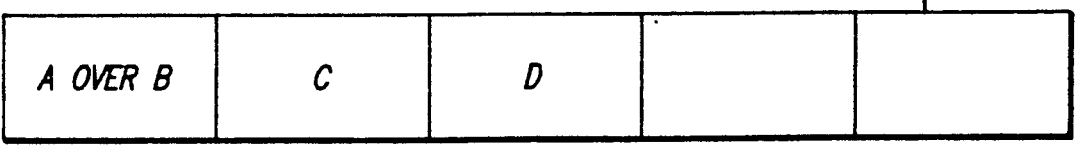
Figure 7F:
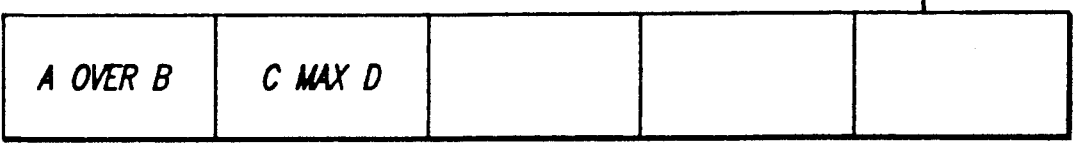
Figure 7G:

The second operation is then performed by loading the first scan line of operand C into the scratch pad memory. The contents of the scratch pad memory are then as shown in FIG. 7D. As shown in FIG. 7E, the operand D is next loaded by the combiner into the scratch pad memory 52. A MAX operation is then executed and the scratch pad memory contents appear as shown in FIG. 7F. In FIG. 7G, the UNDER operation is applied to the results of the OVER and MAX operations and the scratch pad contains that resultant. The above process is repeated for each scan line of the operand images until the desired operation has been executed.

The following pseudo-code implements the basic combiner main loop:

```
For each Y {
    For each token in operation vector {
        if (tokentype == type Plane) {
            increment scanline stack pointer
            if (planetype == type4-comp)
                read scanline into current scanline buffer
            else if (planetype == type 1-comp)
                read mono scanline into alpha of current
                    scanline buffer
            else if (planetype == typeConstant)
                replicate plane-color into current scanline
                    buffer
            if (minification ON) {
                read next scanline; expand as above
                average with first scanline in x&y
            }
        }
        else if (tokentype == typeOp) {
            perform op using top N scanlines on stack as
                args
            pop N-1 scanlines from stack
            if (magnification ON)
                replicate pixels in the top-of-stack scanline
                    in-place in the x direction
            Loop on replication factor {
                if (targetPlaneType == type4-comp)
                    write top scanline to frame buffer
                else if (targetPlaneType == type1-comp)
                    write alpha of top scanline in
                        accordion mode
            }
        }
    }
}
```

TILING

It is sometimes desirable to "stitch" or "tile" the evaluation performed by the combiner. This means that rather than evaluating an operation vector once over a given area, it is evaluated a number of times, each time evaluating a subsection of this area. If the area is very large, this can reduce the memory requirements. For example, if the evaluation area is 3000 pixels by 1000 pixels, it could be "tiled" by the combiner into 6 sub-areas, each of 500 by 1000 pixels.

Tiling is added to the combiner by placing the entire evaluation main loop previously described within another loop; this loop iterates over each sub-area.

EVALUATION ORDER

The evaluation area is evaluated one scanline at a time. Normally, these lines are evaluated in top-to-bottom order, in order of increasing Y. It is sometimes desirable to do the evaluation in bottom-to-top order, decreasing the Y.

This flexibility is added to the combiner by enhancing the part of the main loop described as "for each Y" so that it can proceed by either incrementing Y from its minimum value, or by decrementing Y from its maximum value.

EVALUATION DIMENSION

It is sometimes desirable to evaluate a rectangle in scan line strips which are one column rather one row in size, to evaluate from left-to-right (X-major) rather than from top-to-bottom (Y-major) order.

This is accomplished by changing the "for each Y" logic of the control loop to mean "for each coordinate of the least-often-changing axis" (termed the major axis). The portions of the control loop which actually read or write pixels (the parts that contain "read scanline" or "write scanline" in their description) are then correspondingly enhanced to map the coordinates from major-axis/minor axis format to X/Y format.

HORIZONTAL CONVOLUTIONS

Most combiner operations are what are commonly termed "point processes:" they produce one pixel of output for each pixel of input. Not all operations are point processes. A simple type of non-point process is a horizontal convolution operator, which produces one pixel of output from examining a series of adjacent pixels. For example, consider an operator whose output at a given pixel is the average of itself with its two neighboring pixels. Given 7 input pixels with values of 10, 30, 40, 20, 65, 50, and 80, it produces 5 output pixels with values of 27, 30, 30, 43, and 63. Note that more input pixels are needed than output pixels.

Operators which require this horizontal "broadening" are permitted in the Combiner. This flexibility is added by adding a "size change" field to each entry in the operator vector. This size change indicates how much to "broaden" the original scanline width by when processing that entry.

For example, consider an operation vector which takes a scanline. A and averages it. This is composed OVER scanline B, and that result is again averaged. The operator vector looks like:

A AVERAGE B OVER AVERAGE

If the output of the AVERAGE is to be 100 pixels, then its inputs must each be 102 pixels. Note that A is to be averaged twice, and so the "size change" field associated with each vector (shown in parentheses) is:

A(4) AVERAGE(2) B(2) OVER(2) AVERAGE(0)

MANY-TO-ONE OPERATORS

Horizontal convolution operators are a subset of the class of operators which require more pixels of input than they produce of output. One may also wish to allow operator which require more pixels in a vertical, not just a horizontal direction≧ For example, consider an averaging operator whose output is the average of a pixel with its eight neighboring pixels: 2 to its left and right, 3 above it, and 3 below it.

Adding this functionality to the Combiner require the ability to do a "partial restart" of operation vector evaluation. Each entry in the operation vector knows how many scalines are needed in order for that operation to be evaluated. When it comes time for that entry to evaluate itself, it sees if it has a sufficient number of scanlines. If so, evaluation proceeds normally. If not, operation vector evaluation is partially restarted, in order to get the scanline for this operator.

For example, again consider the operator vector A AVERAGE B OVER AVERAGE. Suppose that now the AVERAGE operators require 3 scalines of input to produce one scanline of output. Then evaluation proceeds by executing the A operator 3 times in order to "satisfy" the first AVERAGE. The B and OVER operators are then performed, and then the entire A-OVER sequence re-evaluated two more times before the second AVERAGE would have enough pixels. The trace of operator evaluation looks like:

```
A
A
A
AVERAGE1
B
OVER
A
AVERAGE1
B
OVER
A
AVERAGE1
B
OVER
AVERAGE2
```

The second and third calls to the first AVERAGE operator require only one, not three, calls to A. This is because the combiner can now "store away" the earlier A's from the previous call to the first AVERAGE, and does not have to read them all every time.

The currently defined operations (A and B are the left and right image arguments to the operations) are as follows:

| | |
|---|---|
| IM_POP | No op; just pop line buffer stack |
| IM_OVER | B <− A + (1 − Aalpha)* B |
| IM_UNDER | B <− B + (1 − Balpha)* A |
| IM_INTO | B <− A* Balpha + (1 − Aalpha)* B |
| IM_INVSCALE | B <− B* (1 − Aalpha) |
| IM_INVERT | Aalpha <− 1 − Aalpha |
| IM_MIN | Balpha <− MIN(Aalpha,Balpha) |
| IM_MAX | Balpha <− MAX(Aalpha,Balpha) |
| IM_MAPA | Aalpha <− Tab[Aalpha] |
| IM_BITMERGE | Balpha <− bitmask&Aalpha+(~abitmask)& Balpha |
| AXB: | dst ← a1 · a0 + a2 |
| INVERT: | dst ← 1 − a0 |
| HUE: | dst ← [hue (a0), sat (a0), val (a0)] |
| MAP: | dst ← a1 [a0] |
| CONVERT1: | dst ← a0 [3] |
| PROJECT: | dst ← a0 [a1] |
| GROUP: | dst ← a0 over a1 lines, extended by a2 |
| OUTPUT: | a0 ← a1 |
| CONVOLVE: | dst ← a1 convolved over a0 |
| DISPLAY: | display 0 to a1, magnifying/minifying by a2 |
| CHA: | dst ← a0 matrix multiplied by a1 |
| RGB2HSV: | dst ← [hue (a0), sat (a0), val (a0)] |
| CLAMPALPHA: | dst ← [a0(0), a0 (1), A0(2), max component of a0] |
| GRADATE: | dst ← a color between a0 and a1 |
| LERP: | dst ← a0 + (a1 − a0) · a2 |
| CLAMP: | dst ← MIN (A0,1) |
| ELLIPSE: | dst ← a line of an ellipse |

There is an equivalency among the various plane types in how they are treated in the combiner. All differentiation between plane types is erased as soon as each plane is read. In particular, a 1-component plane is immediately expanded to 4-components by multiplying its alpha by the plane color. A constant plane is constructed, whenever accessed, by replicating its color in scratch pad the required number of times. This equivalency allows great flexibility in the combiner's use:

None of the above operations require that their arguments be of a particular type. A 4-component ImPlane, for example, could be used with IM_MIN; its RGB columns would simply be ignored. Similarly, a constant ImPlane could be merged under a full color plane, with no specification required to expand it.

We claim:

1. A method of executing operations on images in a computer system comprising the steps of:
   storing a source image having color and opacity values in a storage means in said computer system;
   storing a temporary image of the cumulative effect of all prior operations in said storage means;
   selecting in said computer system a first operation for manipulating an image;
   executing in said computer system said first operation on said temporary image to generate a modified temporary image;
   combining in said computer system said modified temporary image and said source image into a combined image and displaying said combined image;
   selecting in said computer system a second operation for manipulating an image;
   executing in said computer system said first operation on said source image when said second operation is selected;
   preventing execution in said computer system of said first operation on said source image when an undo operation is selected.

2. The method of claim 1 further including the step of displaying in said computer system said source image prior to selection of said first operation.

3. The method of claim 2 further including the step of displaying in said computer system said source image when said undo operation is selected.

4. The method of claim 1 wherein a display image in said computer system is of lower resolution than said source image.

5. An apparatus for executing operations on images in a computer system comprising:
   means for storing a source image having color and opacity values;
   means for storing a temporary image of the cumulative effect of all prior operations in said storage means;
   means for selecting in said computer system a first operation for manipulating an image;
   means for executing in said computer system said first operation on said temporary image to generate a modified temporary image;
   means for combining in said computer system said modified temporary image and said source image into a combined image and displaying said combined image;
   means for selecting in said computer system a second operation for manipulating an image;
   means for executing in said computer system said first operation on said source image when said second operation is selected;
   means for preventing execution in said computer system of said first operation on said source image when an undo operation is selected.

6. The apparatus of claim 5 wherein said source image is displayed in said computer system prior to selection of said first operation.

7. The apparatus of claim 6 wherein said source image is displayed in said computer system when said undo operation is selected.

8. The method of claim 5 wherein a display image in said computer system is of lower resolution than said source image.

9. A method of manipulating an image comprised of a plurality of scan lines in a computer system, said method comprising the steps of:
- selecting in said computer system an operation to be executed on said image, said operation containing a plurality of suboperations;
- executing in said computer system all of said plurality of suboperations on a pair of said plurality of scan lines to generate a modified scan line;
- storing said modified scan line in a buffer in said computer system;
- displaying in said computer system a plurality of modified scan lines after said operation has been executed on all of said plurality of scan lines.

10. A method of executing, in a computer system, operations on an image comprised of a plurality of scan lines, said method comprising the steps of:
- generating in a first processing means a plurality of commands representing operations to be performed on said image;
- providing said commands to a second processing means;
- generating in a combiner component of said second processing means an expression tree representing the hierarchy of the operations to be performed on said image;
- translating in a compilation unit of said combiner component said commands into machine-readable language;
- sequentially executing by said combiner component said operations on each of said plurality of scan lines of said image to generate a plurality of modified scan lines.

11. The method of claim 10 wherein said combiner component generates and executes the nodes of said expression tree in postfix format.

12. The method of claim 10 wherein said second processing means is a parallel processor.

13. The method of claim 10 wherein said combiner component tiles said images into sub-areas before execution of said operations on said image.

14. The method of claim 10 wherein said scan lines are horizontal and said execution is performed in order of the topmost scan line to the bottommost scan line.

15. The method of claim 10 wherein said scan lines are horizontal and said execution is performed in order of the bottommost scan line to the topmost scan line.

16. The method of claim 10 wherein said scan lines are vertical and said execution is performed by defining the horizontal axis as the major axis.

17. The method of claim 10 wherein a subset of said operations are point processes that produce one pixel of output for each pixel of input.

18. The method of claim 10 wherein a subset of said operations operate on more pixels as input than they produce as output.

19. A method of defining the states of a computer system for manipulating images, said method comprising the steps of:
- storing a source image having color and opacity values in a storage means in said computer system;
- storing a temporary image of the cumulative effect of all prior operations in said storage means;
- defining the status of said computer system as a Null State when no operation is pending and said computer system is in a reset state;
- defining the status of said computer system as a Pending State when an operation has taken place on said temporary image and the effect of said operation is visible on the display screen;
- defining the status of said computer system as an Undone State when an undo operation has been selected, said effect of said pending operation is not displayed, and said source image is displayed;
- allowing a transition from said Null State to said Pending State when an operation is selected;
- allowing a transition from said Pending State to said Undone State when said undo operation is selected;
- allowing a transition from said Undone State to said Pending State when an undo undo operation is selected;
- allowing a transition from said Pending State to said Null State when a new operation is selected.

* * * * *